(12) United States Patent
Gregg

(10) Patent No.: US 7,046,696 B2
(45) Date of Patent: May 16, 2006

(54) MULTIPLEXING HIGH PRIORITY, LOW BANDWIDTH INFORMATION ON A TRADITIONAL LINK PROTOCOL

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 09/961,018

(22) Filed: Sep. 21, 2001

(65) Prior Publication Data

US 2003/0061374 A1    Mar. 27, 2003

(51) Int. Cl.
*H04J 3/00* (2006.01)
*G06F 15/173* (2006.01)

(52) U.S. Cl. .................. 370/498; 370/528; 709/240

(58) Field of Classification Search ............... 370/238, 370/442, 444, 458–459, 462; 709/227, 230, 709/238, 240, 236
See application file for complete search history.

(56) References Cited

U.S. PATENT DOCUMENTS

| | | | | |
|---|---|---|---|---|
| 4,313,196 A | * | 1/1982 | Oblonsky | 370/439 |
| 4,486,739 A | * | 12/1984 | Franaszek et al. | 341/59 |
| 4,658,399 A | * | 4/1987 | D'Angio et al. | 714/704 |
| 4,679,188 A | * | 7/1987 | Fukuda et al. | 370/294 |
| 5,304,996 A | * | 4/1994 | Hsu et al. | 341/95 |
| 5,387,911 A | * | 2/1995 | Gleichert et al. | 341/95 |
| 5,548,623 A | * | 8/1996 | Casper et al. | 375/358 |
| 5,651,033 A | * | 7/1997 | Gregg et al. | 375/354 |
| 5,687,200 A | * | 11/1997 | Berger | 375/363 |
| 6,038,230 A | * | 3/2000 | Ofek | 370/389 |
| 6,064,679 A | * | 5/2000 | Hashemi et al. | 370/513 |
| 6,584,509 B1 | * | 6/2003 | Putzolu | 709/240 |
| 6,690,757 B1 | * | 2/2004 | Bunton et al. | 375/371 |
| 6,721,896 B1 | * | 4/2004 | Bond et al. | 713/500 |

* cited by examiner

*Primary Examiner*—Hassan Kizou
*Assistant Examiner*—Brian Roberts
(74) *Attorney, Agent, or Firm*—Lynn L. Augspurger

(57) ABSTRACT

A method and system for multiplexing high priority, low bandwidth information into a link carrying message passing information. The information is multiplexed in a way that keeps the two information streams and their associated hardware largely independent, but allows the most costly system components: the line drivers, receivers, and cables; to be shared by the two functions. The encoding chosen for the high priority information allows its insertion anywhere in the message passing data stream thus minimizing latency and jitter. The encoding is also a subset of the full 8B/10B encode/decode circuit, thus minimizing the extra hardware required.

10 Claims, 6 Drawing Sheets

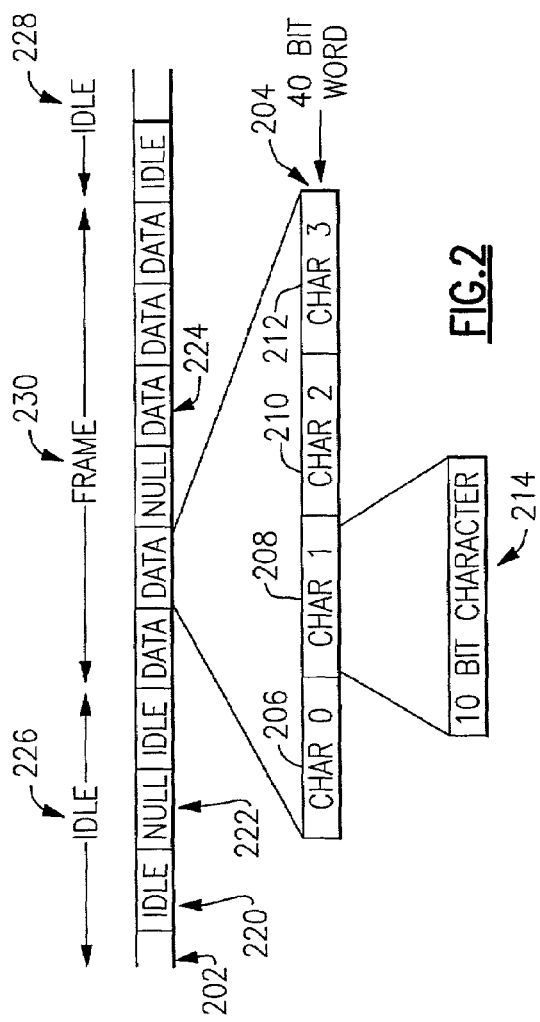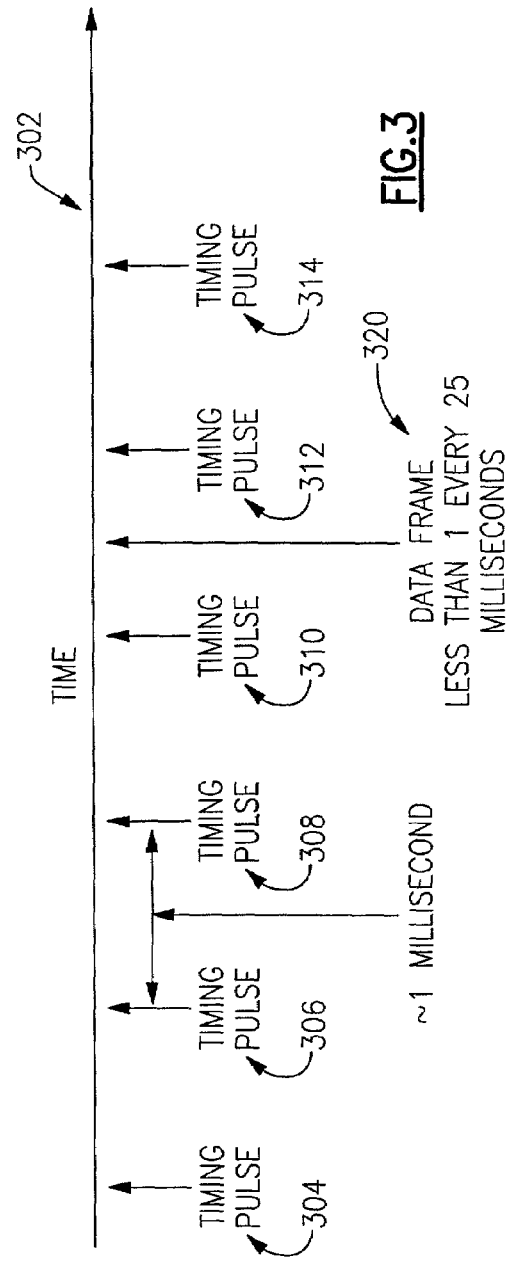

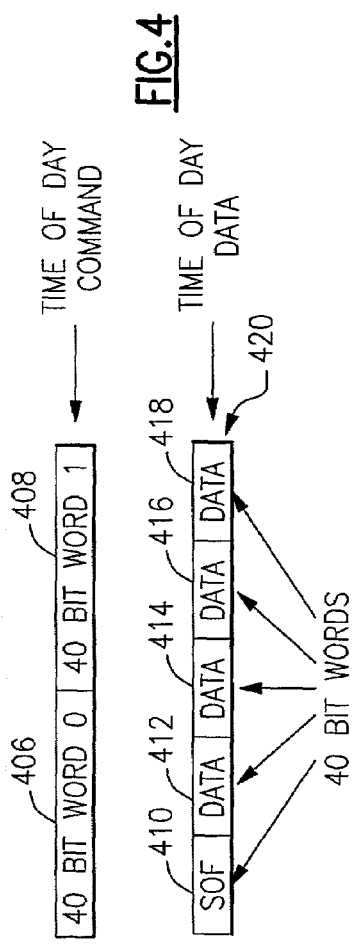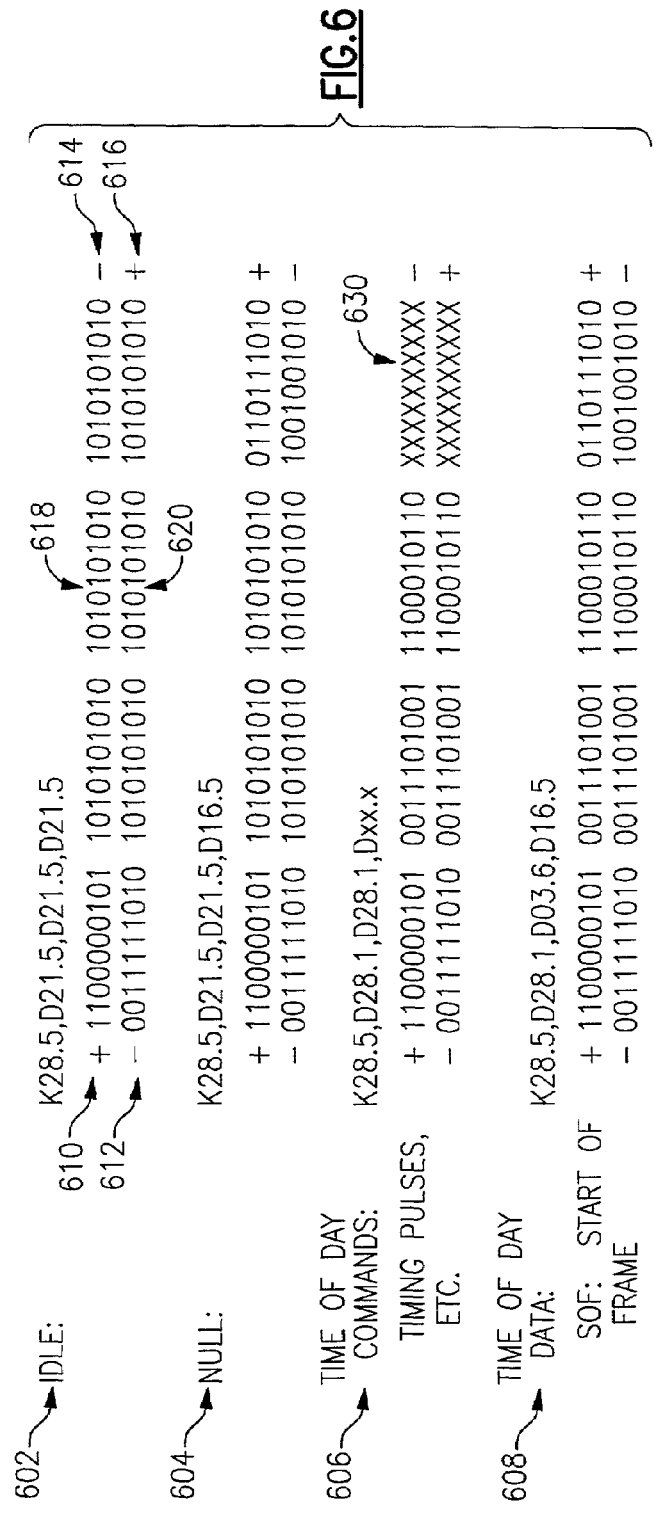

| TIME OF DAY COMMAND NUMBER | 10-BIT 8/10 XXXXXXXXXX IN COMMAND | 8/10 CHARACTER NAME | TIME OF DAY COMMAND NUMBER | 10-BIT 8/10 XXXXXXXXXX IN COMMAND | 8/10 CHARACTER NAME |
|---|---|---|---|---|---|
| 0  | 010101 0101 | D10.2 | 16 | 100101 0101 | D09.2 |
| 1  | 010101 0110 | D10.6 | 17 | 100101 0110 | D09.6 |
| 2  | 010101 1001 | D10.1 | 18 | 100101 1001 | D09.1 |
| 3  | 010101 1010 | D10.5 | 19 | 100101 1010 | D09.5 |
| 4  | 010110 0101 | D26.2 | 20 | 100110 0101 | D25.2 |
| 5  | 010110 0110 | D26.6 | 21 | 100110 0110 | D25.6 |
| 6  | 010110 1001 | D26.1 | 22 | 100110 1001 | D25.1 |
| 7  | 010110 1010 | D26.5 | 23 | 100110 1010 | D25.5 |
| 8  | 011001 0101 | D06.2 | 24 | 101001 0101 | D05.2 |
| 9  | 011001 0110 | D06.6 | 25 | 101001 0110 | D05.6 |
| 10 | 011001 1001 | D06.1 | 26 | 101001 1001 | D05.1 |
| 11 | 011001 1010 | D06.5 | 27 | 101001 1010 | D05.5 |
| 12 | 011010 0101 | D22.2 | 28 | 101010 0101 | D21.2 |
| 13 | 011010 0110 | D22.6 | 29 | 101010 0110 | D21.6 |
| 14 | 011010 1001 | D22.1 | 30 | 101010 1001 | D21.1 |
| 15 | 011010 1010 | D22.5 | 31 | 101010 1010 | D21.5 |

FIG.7

| 4-BIT DATA | 10-BIT 8/10 | 8/10 CHARACTER NAME |
|---|---|---|
| 0000 | 010101 0101 | D10.2 |
| 0001 | 010101 0110 | D10.6 |
| 0010 | 010101 1001 | D10.1 |
| 0011 | 010101 1010 | D10.5 |
| 0100 | 010110 0101 | D26.2 |
| 0101 | 010110 0110 | D26.6 |
| 0110 | 010110 1001 | D26.1 |
| 0111 | 010110 1010 | D26.5 |
| 1000 | 011001 0101 | D06.2 |
| 1001 | 011001 0110 | D06.6 |
| 1010 | 011001 1001 | D06.1 |
| 1011 | 011001 1010 | D06.5 |
| 1100 | 011010 0101 | D22.2 |
| 1101 | 011010 0110 | D22.6 |
| 1110 | 011010 1001 | D22.1 |
| 1111 | 011010 1010 | D22.5 |

FIG.8

MULTIPLEXING HIGH PRIORITY, LOW BANDWIDTH INFORMATION ON A TRADITIONAL LINK PROTOCOL

FIELD OF THE INVENTION

The present invention relates generally to communications between computer systems and, more particularly, the present invention is directed to supporting a method and apparatus to send messages between computer systems.

BACKGROUND

In typical clusters of computer systems, each type of communication traffic requires its own dedicated network of communication links, and each link is optimized for its own traffic. Two of the traffic types that differ the most are those used to send messages and data and those used to keep time of day clocks in synchronism. In IBM's zSeries clusters of computers, the message links are called InterSystem Channels (ISCs) and the time of day links are called External Time Reference (ETR) links. Both of these links exist as parallel interconnects, and they both require their own set of optical drivers and receivers and fiber optic cables. Having a dual infrastructure is expensive. What is required is a way to avoid the duplication of communications networks.

SUMMARY OF THE INVENTION

The present invention combines the functions of the message passing links and the time of day links into a single new link. This is accomplished by multiplexing the very high priority, low bandwidth timing signals with the message passing traffic. This change is achieved by a a method for inserting high priority, low bandwidth traffic onto a link carrying message passing traffic which includes suspending the message passing on any natural coding boundary to minimize latency and jitter of the high priority information, then inserting the high priority information while maintaining the link coding rules; and then the message passing traffic is resumed after the high priority information is sent.

Now industry standard 8B/10B code is used for all traffic in a manner that the message passing traffic is suspended on any 40 bit, 4 character, 8B/10B boundary; this allows adjustment of the high priority information encoding in relation to the running disparity of the message passing traffic. The high priority information has a total disparity of zero; and then the message passing traffic is resumed without changing its encoding as a result of inserting the high priority information.

It is another object of the present invention to keep the message passing and time of day functions and supporting hardware as separate as possible from each other. The message passing and time of day signals are multiplexed together as close to the actual optical drivers and receivers as possible. The object of the invention is to share the drivers, receivers, and optical fiber interconnection cables. By keeping the hardware supporting the two functions as independent as possible, hardware and design errors, and their detection and recovery can remain very independent.

It is another object of the present invention to retain the prior link protocol of the message passing function and add the time of day signals in a way that does not adversely affect the message passing design.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 illustrates the format of the message passing information on the link;

FIG. 3 illustrates the time of day protocols on the link;

FIG. 4 illustrates the format of the time of day information on the link;

FIG. 6 illustrates the encoding of the various special words used in the system;

FIG. 7 illustrates the codes chosen for the time of day commands;

FIG. 8 illustrates the codes chosen for the time of day data; and

DETAILED DESCRIPTION OF THE PREFERRED EMBODIMENT

Figure 1:
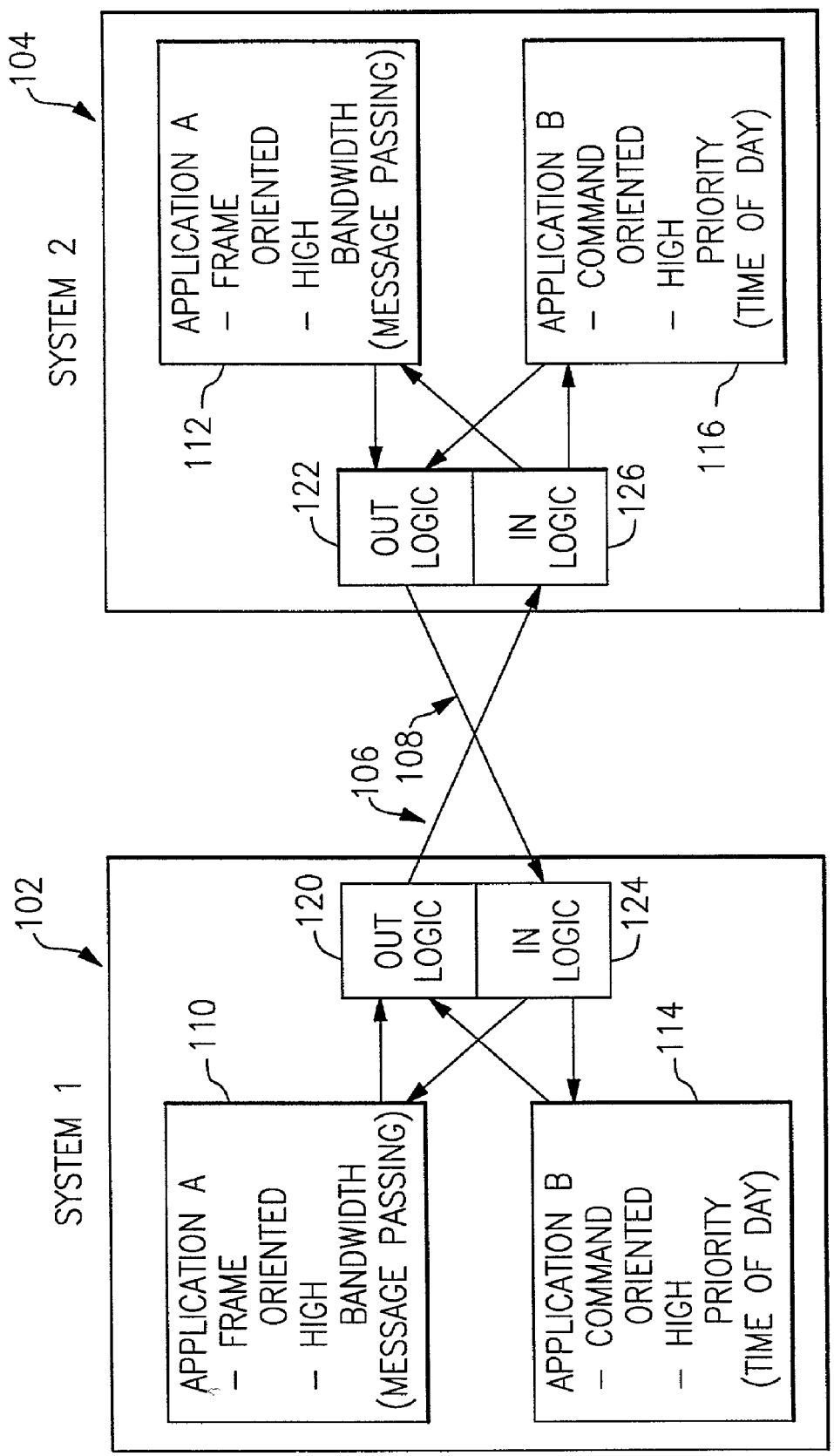
FIG. 1 illustrates two systems each having two applications interconnected by a link.

FIG. 1 shows System 1 102 connected to System 2 104 by two links 106, 108, one in each direction. Within each system, there are two relatively unrelated applications, applications A 110, 112, used to pass messages; and applications B 114, 116, used to synchronize time of day hardware. The application A 110 in System 1 102 communicates with application A 112 in System 2 104, and application B 114 in System 1 102 communicates with application B 116 in System 2 104. The Out Logic 120, 122 in System 1 102 and System 2 104 takes outbound information from applications A 110, 112 and applications B 114, 116 and combines them for transmission over links 106, 108. The In Logic 124, 126 in System 1 102 and System 2 104 takes inbound information from links 106, 108 and separates it into information for applications A 110, 112 and information for applications B 114, 116.

All of the information transmitted over links 106, 108 is encoded using the code described in U.S. Pat. No. 4,486,739, issued Dec. 4, 1984 to Franaszek et al for "Byte Oriented DC Balanced (0,4) 8B/10B Partitioned Block Transmission Code" and assigned to the assignee of the present invention. This invention discloses a binary code and an encoder circuit which transmits an 8 bit byte of information into 10 binary digits for transmission over electromagnetic or optical transmission lines. Outside of encoding the 256 possible 8 bit byte values, the code provides at least one special character, called a K character, used to achieve character synchronism and to signal special conditions.

FIG. 2 shows the format of the information stream over links 106, 108 of FIG. 1. Stream 202 represents the flow of bits over the link in the absence of any time of day information being transmitted; only message passing information is shown. The information is transmitted in 40 bit blocks known as words 204, and each 40 bit word is composed of four 10 bit characters 206, 208, 210, 212. Each 10 bit character 214 is defined by the 8B/10B code. When only message passing information is transmitted on the links, there are three different types of 40 bit words. The Idle word starts with a K28.5 character followed by three D21.5 characters. Idle words are transmitted when there are no frames are being transmitted; this is called the Idle sequence 226, 228. Groups of Data words 224 make up frames 230, and each Data word has four data characters. The Null 222 word is inserted anywhere in the data stream and is used to limit the flow of Idle and Data words. When the transmitter temporarily runs out of Idle or Data words to send, it can insert Null words. Also, when the receiver cannot receive Idle and Data words at the full link speed, it can instruct the transmitter at the other end of the link to insert null words periodically into the information stream. The Null word is a K28.5 character followed by two D21.5 characters followed by a D16.5 character. All of the characters and words described above are also described in FIG. 6 and in U.S. Pat. No. 5,548,623, issued Aug. 20, 1996 to Casper et al for "Null Words for Pacing Serial Links to Driver and Receiver Speeds" and assigned to the assignee of the present invention.

FIG. 3 shows a time line 302 of the information required by the time of day function. Regular timing pulses 304, 306, 308, 310, 312, 314 are sent at approximately one millisecond intervals. These pulses are sent as time of day commands, and they are used to keep the phase locked loop, and therefore the time of day at the receiving end of the link, in synchronism with the transmitting end of the link. Other commands may be used in place of the timing pulses to indicate certain time of day status conditions. Occasionally, some time of day data 320 is required to be transmitted over the link. This information may include the actual time of day, date, configuration, leap second, and other information.

FIG. 4 shows the format of the time of day commands 402 and time of day data 404. The time of day commands consist of two 40 bit words 406, 408 transmitted back to back. The second word has the same information as the first and it is sent with the opposite disparity of the first word. Together, the two words perform a powerful error checking function. To reduce latency and jitter, the time of day commands may be inserted on any 40 bit word boundary of the message passing information stream. The format of the time of day data 420 is a sequence of five 40 bit words. The first word is a Start of Frame (SOF) 410 delimiter, and the other four words are data words 412, 414, 416, 418 containing the actual time of day data.

Figure 5:
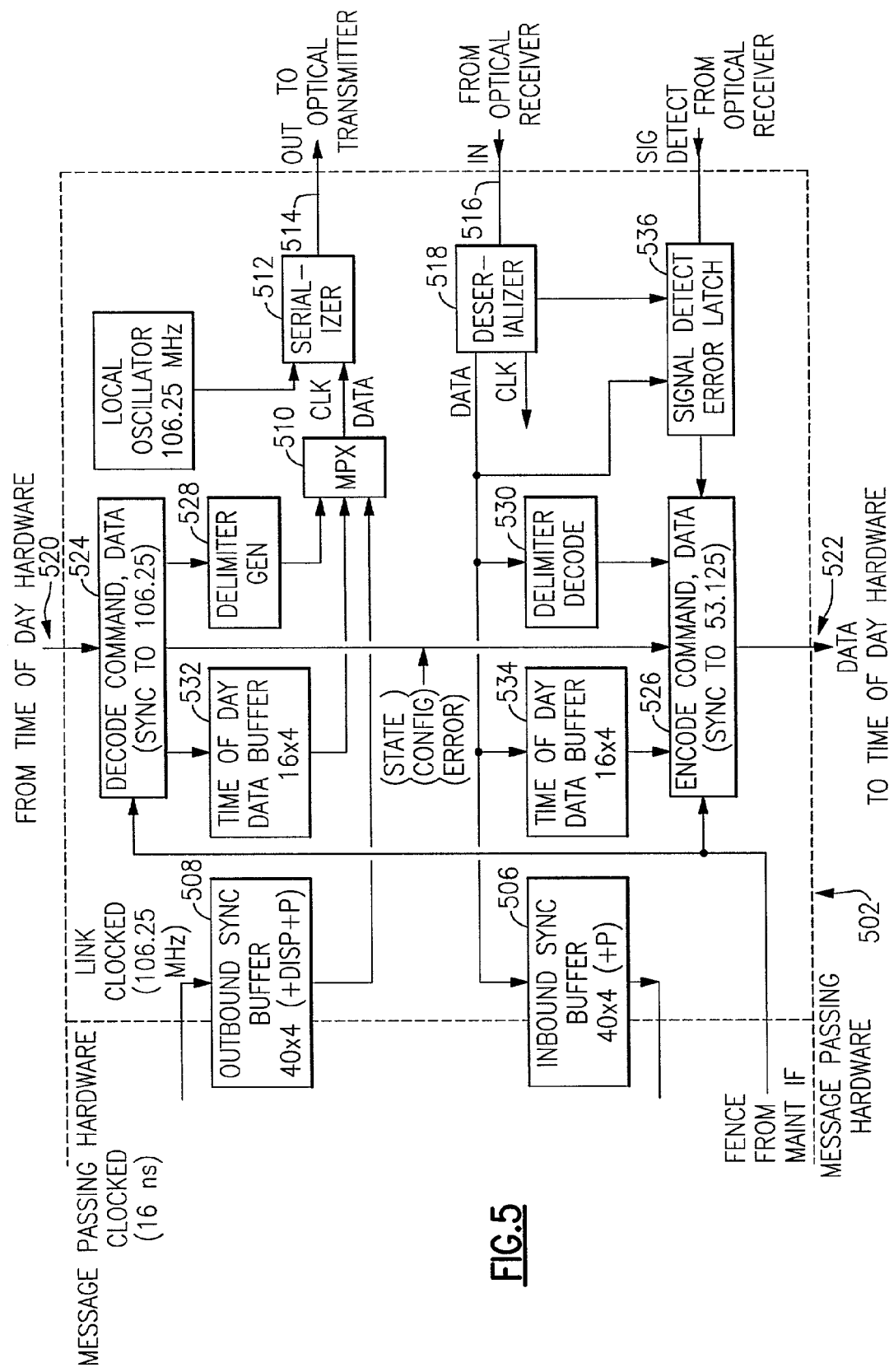
FIG. 5 illustrates the details of the inbound and outbound multiplexing hardware.

FIG. 5 shows the Out logic 120, 122 and In logic 124, 126 described in FIG. 1. The fundamental design consideration is to isolate message passing hardware failures from time of day hardware failures, and vice versa. By sharing as little hardware as possible, errors and recovery actions in message passing and time of day hardware do not interact. The cable, optics, serializer, and deserializers must be shared, but as little of the other hardware is shared as possible. The only shared hardware is the switching functions for inserting and extracting time of day information into/from the message passing information, and the encoding and decoding of this time of day information. It also is appropriate to keep the optics in close proximity to the message passing hardware and implement the switching functions within this hardware. There are two reasons for this. First, most of the information sent over the link is for message passing; and second, many message passing links will not be transporting time of day information.

This design approach puts the switch functions in the link clocked sections 504 of the message passing hardware 502. The result is that practically no errors (design and circuit malfunctions) in the message passing portions of the design will affect the delivery and reception of the time of day information. None of the software for the message passing function is required for transporting any of the time of day information, and the time of day functions continue even when the message passing hardware clocks are stopped.

Referring to FIG. 5 again, information to and from the message passing hardware is sent through the inbound sync buffer 506 and outbound sync buffer 508, respectively. These buffers are the dividing line between the message passing hardware clocked logic and the link clocked logic 504. From the outbound sync buffer, message passing information flows through multiplexor (MPX) 510 to serializer 512 and onto the outbound link 514 through the optical transmitter. Information received from the optical receiver 516 goes through the deserializer 518; and if it is for the message passing function, it goes to the inbound sync buffer 506. Meanwhile, the time of day information is received from the time of day hardware over interface 520 and is sent to the time of day hardware over 522. The format of this data is not specified in the present invention, but those skilled in the art would choose any number of serial or parallel signaling mechanisms. The physical length of these interfaces is relatively short, so they are inexpensive and no exotic encoding schemes are required. Information from the time of day hardware is decoded in decoder 524 where commands and data are detected. If a command is detected, the hardware generates the appropriate pair of 40 bit words in the delimiter gen 528 and sends them to the multiplexor where they are immediatly sent to the serializer 512. If time of day data is detected, the data payload is accumulated in the time of day data buffer 532, and when it is all received from decoder 525, the start of frame is generated by delimiter gen 528 followed by the encoded data from the time of day data buffer 532 and sent through the multiplexor 510 and over the outbound link 514.

As information is received from the optical receiver, it is examined for time of day information by delimiter decode 530. If a pair of command 40 bit words is decoded, they are encoded in encoder 526 and sent over interface 522 to the time of day hardware. If a start of frame is decoded, the next four 40 bit words are decoded and placed into the time of day data buffer 534. After all of the data payload is received, it is sent to the time of day hardware. The signal detect error latch 536 causes a special error indicator to be sent to the time of day hardware.

To review the prior message passing coding, information is transferred by 40 bit words, and the links maintain word synchronism all of the time. The Idle word is a K28.5 followed by three D21.5 characters. The K28.5 provides the coding singularity (five 1's or 0's in a row) required for word synchronization. The D21.5 has the maximum transition density to ease clock extraction. The Idle word has a non zero disparity, and the plus and minus versions alternate during a long idle sequence.

The Null word is similar to the Idle. The trailing D21.5 is replaced by the D16.5. The Null encoding also has two versions depending on the running disparity of the data stream. Null words have zero disparity, and they are inserted into any sequence of words without changing the encoding of the subsequent words.

All of the words to support time of day signaling are also similar to the Null; however, to make these words less susceptible to being falsely detected, two or three of the D21.5 characters are altered rather than only one as in the Null.

FIG. 6 summarizes the special 40 bit words defined for both the message passing and time of day information. For each of the four special words, there are two encodings determined by the running disparity. For example, the Idle word 602 has encoding 618 and 620. When the running disparity is plus 616, encoding 618 is used. Since the idle word has a non-zero disparity, the running disparity after encoding 618 is transmitted is minus 614. Likewise, when the running disparity is minus 612, encoding 620 is sent, and the running disparity is now plus 616. The enocdings for the null 604, time of data commands 606, and time of day start of frame (SOF) 608 are also shown. Note that nulls 604 and time of day SOFs 608 have zero disparity and do not alter the running disparity of the data stream.

FIG. 7 shows the encoding of the last character 630 of the time of day command 606 of FIG. 6. This character specifies one of 32 possible time of day commands; one of these commands is the timing pulse. When the time of day hardware sends a command over interface 520, it identifies it with a command number 702, 708. Likewise, when a time of day command is received and sent back to the time of day hardware, it is also tagged with a command number 702, 708. This command number is a five bit field and it is translated into 10 bit characters. Each of the five bits is individually translated into two bits of the 10 bit character. In these 32 10 bit data characters, a logical 0 is coded as '01'b and a logical 1 is coded as '10'b. The resulting 32 characters are valid 8/10 data characters 704, 710, and they have the same coding regardless of the running disparity. Also, they all have zero disparity.

When a time of day command is detected on the link, the forth character of the first 40 bit word is decoded using the same algorithm used by the encode function. In addition, the second 40 bit word is also checked to see that it has the same encoding (with different disparity) as the first 40 bit word. If the two words pass the check, the command tagged with the command number is sent to the time of day hardware over interface 522.

All 32 time of day commands have a plus and minus disparity version, and they all have non zero disparity. This means that they must be transmitted in pairs to preserve the running disparity of the normal message passing traffic. By choosing the proper disparity, the two word flags can be inserted anywhere (on 40 bit word boundaries) in the data stream without changing the coding of subsequent words. Using pairs of words also improves error detection and reduces the chances of falsely detecting a command as described in the pervious paragraph.

The time of day start of frame (SOF) delimiter 608 shown in FIG. 6 begins with a K28.5 followed by a D28.1; the same as the time of day commands. The third character is a D03.6 (1100010110) and the last is a D16.5 (0110111010 or 1001001010). The D16.5 is also used in the Null, and therefore, the SOF word has a plus and minus disparity version. By choosing the proper version, the SOF delimiter can be inserted anywhere (on 40 bit word boundaries) in the data stream. Unlike the time of day commands, the SOF word has zero disparity. This means that a single SOF word does not alter the running disparity of the normal message passing traffic. When the time of day hardware sends a command over interface 520, it also sends 8 bytes of data. The link clocked logic stops transmission from the message hardware, and inserts the proper SOF word based on the running disparity. After the SOF is transmitted, the link clocked logic sends the time of day data payload by first reading the bits from the time of day data buffer 532. The encoding of this data is shown in FIG. 8. All of the characters used to send the payload have a zero running disparity, and in fact the coding is a subset of the codes used by the last character in the time of day commands.

As shown in FIG. 8, the code used for the payload encodes 4 bit data blocks into 10 bit characters. The first two bits of the 10 bit characters are pad bits ('01'b), and they allow easy alignment between the data in the time of day data buffer and the 40 bit words on the link. By assigning a code of '01'b for a logical 0 and '10'b for a logical 1, the remaining 8 bits of the 10 bit characters represent four data bits. Then each data byte is coded into two 10 bit characters, and the entire eight payload requires four 40 bit words.

All of the 16 8/10 characters in FIG. 8 are valid 8/10 data characters, and have the same coding regardless of the running disparity, Also, they all have zero disparity. After 16 of these characters are transmitted (160 bits), the normal message passing character stream can be restarted without changing the coding of subsequent words. No end of frame delimiter is required.

Figure 9:
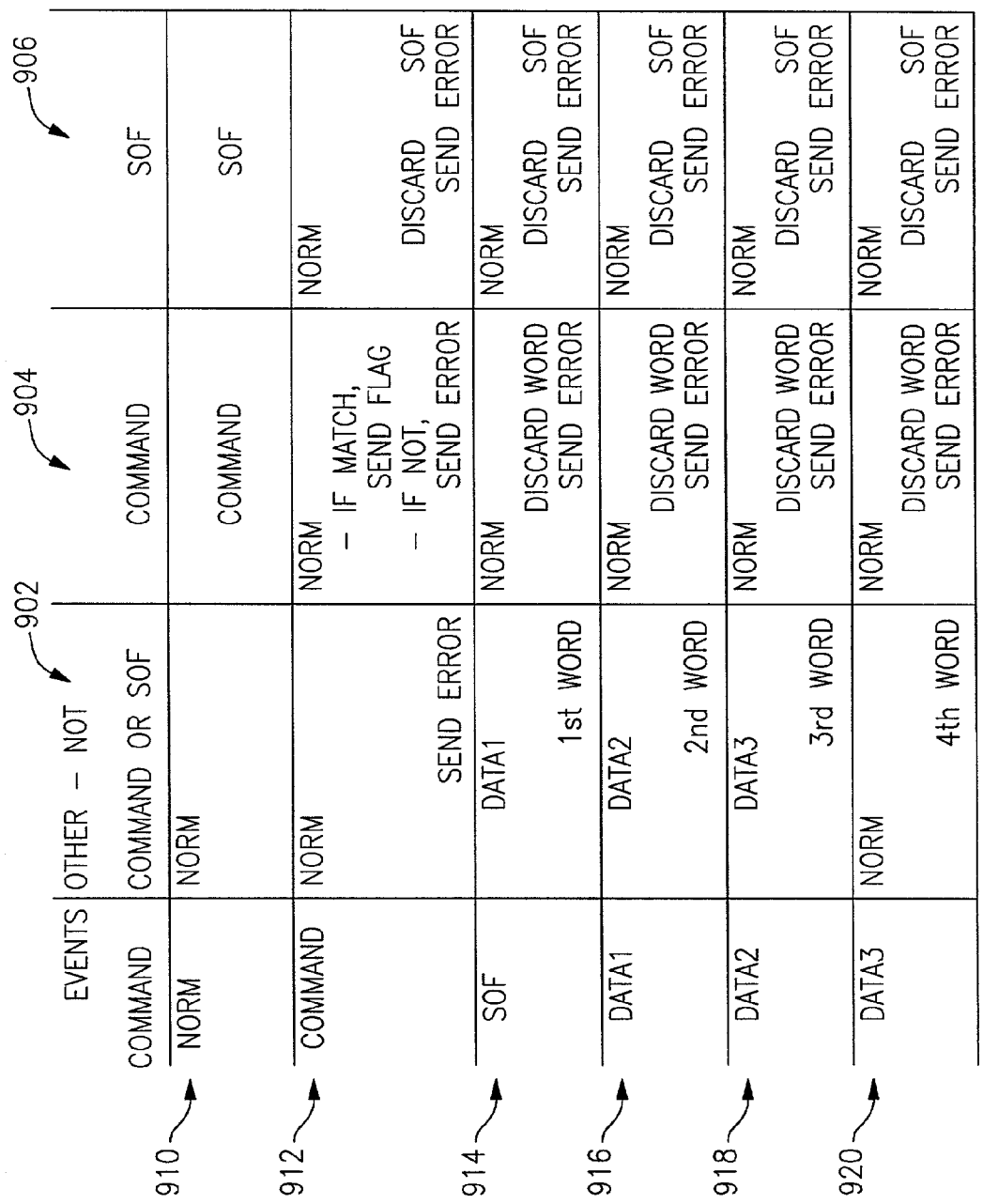
FIG. 9 illustrates the state machine used to recognized and decode the time of day traffic.

FIG. 9 shows the operation of the state machine in the link clocked logic used to receive time of day commands and time of day data. Along the top of the figure are the events which are words received over the link. They are words other than a command or SOF 902, a command word 904, and an SOF word 906. The state machine only decodes both versions of the commands and SOF words. Along the left hand side of the figure are the states. The states assume a four word time of day data frame size (160 link bits for 64 time of day data bits). The states are NORM 910 indicating that normal message passing traffic is being received, Command 912 indicating that the first of two command words has been received, SOF 914 indicating that an SOF word has been received, DATA1 916 indicating that the first payload word has been received, DATA2 918 indicating that the second payload word has been received, and DATA3 920 indicating that the third payload work has been received. The top line within each box of FIG. 9 shows the next state and the second line describes any actions to be taken.

When the state machine is not receiving time of day information, it is in the normal (NORM) state 910. When a time of day command is detected, the Command state is entered, and the next word expected is the second command word. Receipt of the second word causes the appropriate command to be sent to the time of day hardware, and the state machine enters the NORM state. If the forth character of the command is not one of the 32 valid flag characters, an error is recognized. If the second command word does not have the same last character as the first word, an error is recognized.

There are only a few sequencing rules implied by the state machine:

1) The command words must always be transmitted in pairs.
2) The command words may not occur within a time of day data sequence.
3) Exactly four OTHER words following an SOF are extracted from the link and are considered as the payload.

The state machine does not check for 8/10 code violations, so all of the errors it detects appear as the wrong sequence of words. Assuming that the design is correct, these errors are caused by bit errors on the link. If a code error in the time of day data is detected by the state machine, the error is reported to the time of day hardware. The received word that caused the error may be passed to the message passing hardware where other errors may be detected.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for communication of message passing traffic between computer systems connected by a link, comprising the steps of:
   inserting high priority, low bandwidth traffic onto a link carrying message passing traffic by:
   suspending the message passing on any natural coding boundary to minimize latency and jitter of the high priority information;
   inserting the high priority information;
   maintaining the link coding rules; and
   resuming the message passing traffic after the high priority information is sent; and,
   wherein 8B/10B code is used for all traffic such that:
   the message passing traffic is suspended on any 40 bit, 4 character, 8B/10B boundary when the message passing traffic on any natural coding boundary is suspended to minimize latency and jitter of the high priority information; and
   the high priority information encoding is adjusted in relation to a running disparity of the message passing traffic when the message passing traffic on any natural coding boundary is suspended to minimize latency and jitter of the high priority information; such that
   the high priority information has a total disparity of zero; and thereafter
   the message passing traffic is resumed without changing its encoding as a result of inserting the high priority information.

2. The method as recited in claim 1, wherein before adjustment said high priority information is encoded by:
   selecting a first set of special 8B/10B characters indicating that a next data character identifies a high priority command; and then upon suspension of said message passing traffic;
   choosing one of two sets of special 8B/10B characters depending on the running disparity of the suspended message passing traffic;
   encoding the high priority command as a 1B/2B subset of the 8B/10B encodings; and
   sending the command twice to detect transmission errors.

3. The method as recited in claim 2, including:
   selecting a second set of 8B/10B characters indicating that the next set of characters identify as a data payload; and then
   choosing one of said first and second sets of said special 8B/10B characters depending on the running disparity of the suspended message passing traffic as an identifier; and
   encoding the data payload as a 1B/2B subset of the 8B/10B encodings; and
   sending 160 bits on the link to represent 64 bits of data payload.

4. The method recited in claim 2 wherein, a state machine is defined to recognize the set of special 8B/10B identifier characters, and further comprising the steps of:
   extraction of a data character to represent the high priority command after selecting a first set of special 8B/10B characters indicating that a next data character identifies a high priority command, and;
   decoding said data character extracted to represent the high priority command as 1B/2B subset of the 8B/10B code;
   recognizing the second set of special 8B/10B identifier characters;
   decoding the data character as a 1B/2B subset of the 8B/10B code; and
   comparing the first data character with the second data character to check for errors.

5. The method recited in claim 3 wherein, a state machine is defined to recognize the set of special 8B/10B identifier characters, and said steps include:
   extraction of a set of data characters following the identifier to represent the data payload;
   decoding the data characters as a 1B/2B subset of the 8B/10B code; and
   assembling 64 bits of data payload from the 160 encoded bits following the identifier.

6. A method for communication of message passing traffic between computer systems connected by a link, comprising the steps of:
   inserting high priority, low bandwidth traffic onto a link carrying message passing traffic by:
   suspending the message passing traffic on any natural coding boundary to minimize latency and jitter of the high priority information;
   inserting the high priority information;
   maintaining the link coding rules; and
   resuming the message passing traffic after the high priority information is sent; and,
   wherein the high priority information inserted are high priority timing signal information that interrupt normal message passing and are inserted anywhere in the data stream on word boundaries; and,
   wherein 8B/10B code is used for all traffic such that:
   the message passing traffic is suspended on any 40 bit, 4 character, 8B/10B boundary when the message passing traffic on any natural coding boundary is suspended to minimize latency and jitter of the high priority timing signal information; and
   the high priority timing signal information encoding is adjusted in relation to a running disparity of the message passing traffic when the message passing traffic on any natural coding boundary is suspended to minimize latency and jitter of the high priority information; such that
   the high priority timing signal information has a total disparity of zero; and thereafter
   the message passing traffic is resumed without changing its encoding as a result of inserting the high priority timing signal information.

7. The method as recited in claim 6, wherein before adjustment said high priority timing signal information is encoded by:
   selecting a first set of special 8B/10B characters indicating that a next data character identifies a high priority command; and then upon suspension of said message passing traffic
   choosing one of two sets of special 8B/10B characters depending on the running disparity of the suspended message passing traffic;
   encoding the high priority command as a 1B/2B subset of the 8B/10B encodings; and
   sending the command twice to detect transmission errors.

8. The method as recited in claim 7, including:
   selecting a second set of 8B/10B characters indicating that the next set of characters identify as a data payload; and then choosing one of said first and second sets of said special 8B/10B characters depending on the running disparity of the suspended message passing traffic as an identifier; and encoding the data payload as a 1B/2B subset of the 8B/10B encodings; and sending 160 bits on the link to represent 64 bits of data payload.

9. The method recited in claim 7 wherein, a state machine is defined to recognize the set of special 8B/10B identifier characters, and further comprising the steps of:

extraction of a data character to represent the high priority command after selecting a first set of special 8B/10B characters indicating that a next data character identifies a high priority command, and;

decoding said data character extracted to represent the high priority command as a 1B/2B subset of the 8B/10B code;

recognizing the second set of special 8B/10B identifier characters;

decoding the data character as a 1B/2B subset of the 8B/10B code; and comparing the first data character with the second data character to check for errors.

10. The method recited in claim 9 wherein, a state machine is defined to recognize the set of special 8B/10B identifier characters, and said steps include:

extraction of a set of data characters following the identifier to represent the data payload;

decoding the data characters as a 1B/2B subset of the 8B/10B code; and assembling 64 bits of data payload from the 160 encoded bits following the identifier.

* * * * *